US011223875B2

(12) United States Patent
Saito

(10) Patent No.: US 11,223,875 B2
(45) Date of Patent: Jan. 11, 2022

(54) SYSTEMS AND METHODS FOR PERFORMING AN ACTION BASED ON VIEWING POSITIONS OF OTHER USERS

(71) Applicant: Rovi Guides, Inc., San Jose, CA (US)

(72) Inventor: Sakura Saito, Tokyo (JP)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/109,256

(22) Filed: Aug. 22, 2018

(65) Prior Publication Data
US 2019/0014379 A1    Jan. 10, 2019

Related U.S. Application Data

(63) Continuation of application No. 15/195,001, filed on Jun. 28, 2016, now Pat. No. 10,080,052.

(51) Int. Cl.
| | |
|---|---|
| *H04N 21/472* | (2011.01) |
| *H04N 21/4788* | (2011.01) |
| *H04N 21/442* | (2011.01) |
| *G11B 27/34* | (2006.01) |
| *H04N 21/262* | (2011.01) |

(Continued)

(52) U.S. Cl.
CPC ..... *H04N 21/44218* (2013.01); *G11B 27/105* (2013.01); *G11B 27/34* (2013.01); *H04N 21/262* (2013.01); *H04N 21/432* (2013.01); *H04N 21/4335* (2013.01); *H04N 21/44* (2013.01); *H04N 21/4435* (2013.01); *H04N 21/44204* (2013.01); *H04N 21/4788* (2013.01); *H04N 21/47202* (2013.01); *H04N 21/47217* (2013.01); *H04N 21/4821* (2013.01);

(Continued)

(58) Field of Classification Search
CPC ........... H04N 21/44218; H04N 21/262; H04N 21/432; H04N 21/4335; H04N 21/44; H04N 21/44204; H04N 21/4435; H04N 21/47202; H04N 21/47217; H04N 21/4788; H04N 21/4821; H04N 21/4826; H04N 21/6587; H04N 21/8455
See application file for complete search history.

(56) References Cited

U.S. PATENT DOCUMENTS

| | | | | |
|---|---|---|---|---|
| 2002/0174430 | A1* | 11/2002 | Ellis ..................... | H04N 21/812 |
| | | | | 725/46 |
| 2004/0244030 | A1* | 12/2004 | Boyce .................. | G11B 19/025 |
| | | | | 725/25 |

(Continued)

*Primary Examiner* — Pinkal R Chokshi
(74) *Attorney, Agent, or Firm* — Haley Guiliano LLP

(57) ABSTRACT

Systems and methods for performing an action based on viewing positions of other users are provided. Viewing progress in a media asset of each of a plurality of users is retrieved. The viewing progress of each of the plurality of users is compared to identify a maximum viewing progress that is common to each of the plurality of users. A request from a user to access the media asset is received. A current viewing progress in the media asset of the user is monitored to determine when the current viewing progress of the user matches the identified maximum viewing progress that is common to each of the plurality of users. In response to determining that the current viewing progress of the user matches the identified maximum viewing progress, a message with an option to perform an action relative to the media asset is generated for display to the user.

18 Claims, 6 Drawing Sheets

(51) Int. Cl.
   *H04N 21/4335*   (2011.01)
   *H04N 21/443*   (2011.01)
   *H04N 21/6587*   (2011.01)
   *H04N 21/845*   (2011.01)
   *G11B 27/10*   (2006.01)
   *H04N 21/432*   (2011.01)
   *H04N 21/44*   (2011.01)
   *H04N 21/482*   (2011.01)

(52) U.S. Cl.
   CPC ..... *H04N 21/4826* (2013.01); *H04N 21/6587* (2013.01); *H04N 21/8455* (2013.01)

(56) References Cited

U.S. PATENT DOCUMENTS

| | | | |
|---|---|---|---|
| 2006/0045472 A1* | 3/2006 | Poslinski | G11B 27/034 386/282 |
| 2007/0157249 A1* | 7/2007 | Cordray | H04N 21/4825 725/58 |
| 2010/0086277 A1* | 4/2010 | Craner | H04N 5/76 386/278 |
| 2013/0254308 A1* | 9/2013 | Rose | H04N 21/252 709/206 |
| 2014/0201632 A1* | 7/2014 | Kunigita | H04N 21/4667 715/716 |
| 2014/0226953 A1* | 8/2014 | Hou | H04N 21/47217 386/230 |
| 2015/0089372 A1* | 3/2015 | Mandalia | G11B 27/34 715/720 |
| 2015/0110460 A1* | 4/2015 | Choi | H04N 7/147 386/224 |
| 2016/0029057 A1* | 1/2016 | Wickenkamp | H04N 21/252 725/14 |
| 2016/0117067 A1* | 4/2016 | Ghosh | G06F 3/0483 715/753 |
| 2017/0013289 A1* | 1/2017 | Nightingale | H04N 21/2181 |
| 2017/0171626 A1* | 6/2017 | Eatedali | H04N 21/4788 |

* cited by examiner

SYSTEMS AND METHODS FOR PERFORMING AN ACTION BASED ON VIEWING POSITIONS OF OTHER USERS

CROSS REFERENCE TO RELATED APPLICATION

This application is a continuation of U.S. patent application Ser. No. 15/195,001, filed Jun. 28, 2016, currently allowed, which is hereby incorporated by reference herein in its entirety.

BACKGROUND

Typical systems monitor viewing progress in a given media asset for a group of users and store the monitored viewing progress in memory. A user can request to see the list of the viewing progress for each of the group of users. In this case, the systems simply recall the viewing progress information stored in memory and display the information to the user. The systems do not, however, perform any analysis on how much of the given media asset one user in the group partially viewed relative to another. In some circumstances, the systems may update the viewing progress to indicate whether the users in the group completely watched the given media asset. When the stored viewing progress indicates that the last member of the group of users completely watched the media asset, the systems provide the last member an option to delete a recording of the media asset. Even in these circumstances, the systems do not compare the partial viewing progress of one user to another. Therefore, typical systems do not react in real time to tailor options presented to a given user based on how much the given user partially viewed a media asset relative to another user.

SUMMARY

Accordingly, methods and systems are disclosed herein for performing an action based on viewing positions (or partial viewing progress) of other users (e.g., while a given user accesses a media asset). In some embodiments, viewing progress of a user may be monitored while the user accesses the media asset. The current viewing position may be compared with a maximum viewing progress of a plurality of users (e.g., other users associated with the user who is accessing the media asset). For example, the maximum viewing progress may be the earliest of the play positions in the media asset up to which each of the plurality of users has accessed. When the current viewing position matches or exceeds the maximum viewing progress of the plurality of users, options to delete a recording of the media asset, communicate with one of the plurality of users, and/or post a comment to a social network associated with the user may be presented to the user. This provides the user with an opportunity to perform an action relating to the media asset as soon as the user reaches the same viewing position that at least all the other users have seen. For example, the user can discuss the media asset with the other users freely without worrying about revealing a spoiler and/or may choose to delete the media asset if the user determines that the others will likely not return to finish watching the media asset (e.g., because all the interesting segments have been watched).

Accordingly, unlike traditional systems that provide options, such as a delete option, to a user when the user completes viewing a media asset, the methods and systems disclosed herein provide options to the user when the user reaches a maximum viewing progress (maximum partial viewing progress) of a group of users. In providing options to the user at the end of the media asset only when all other users finished viewing the media asset, traditional systems fail to account for the situation that, although some users have started watching a media asset but not finished (e.g., watched partially), they may no longer be interested in finishing the media asset (e.g., because the most interesting portions of the media asset have been watched). In doing so, the traditional systems fail to account for the situation where one of the users will not return to finish viewing the media asset. As such, the traditional systems may end up never presenting the option to delete the media asset to a given user even though the given user has finished viewing the media asset. As a result, a stale media asset that viewers started viewing and are not interested in finishing may not end up being selected for deletion by a given user, causing wasted storage space. In addition, the user in these traditional systems misses an opportunity to discuss a media asset with other users as soon as the user catches up to a play position that all the other users have seen.

In some embodiments, viewing progress in a media asset of each of a plurality of users may be retrieved. A first data structure associated with a first of the plurality of users may be processed to identify a first play position of the first user in the media asset. A second data structure associated with a second of the plurality of users may be processed to identify a second play position of the second user in the media asset. The first play position may be compared with the second play position. In response to determining that the second play position is earlier than the first play position, the second play position may be stored as a maximum viewing progress that is common to each of the plurality of users. A play point corresponding to the maximum viewing progress may be after a start point of the media asset and before an end point of the media asset.

In some embodiments, a request from a user to access the media asset may be received. Data indicating current viewing progress in the media asset of the user may be retrieved. The retrieved data indicating the current viewing progress may be compared to the stored maximum viewing progress to determine whether the current viewing progress of the user matches the maximum viewing progress that is common to each of the plurality of users. In response to determining that the current viewing progress of the user matches the identified maximum viewing progress, a message with an option to perform an action relative to the media asset may be generated for display to the user.

In some embodiments, viewing progress in a media asset of each of a plurality of users is retrieved. The viewing progress of each of the plurality of users is compared to identify a maximum viewing progress that is common to each of the plurality of users. A request from a user to access the media asset is received. A current viewing progress in the media asset of the user is monitored to determine when the current viewing progress of the user matches the identified maximum viewing progress that is common to each of the plurality of users. In response to determining that the current viewing progress of the user matches the identified maximum viewing progress, a message with an option to perform an action relative to the media asset is generated for display to the user.

In some implementations, the media asset may be stored at a scheduled transmission time of the media asset. The viewing progress of each of the plurality of users in the stored media asset may be monitored to retrieve the viewing progress of each of the users. In some implementations, the action includes a delete operation. In such circumstances, the stored media asset is deleted in response to receiving a user selection of the option.

In some implementations, the action includes a communicate operation. In such circumstances, a list that identifies each of the plurality of users may be displayed in response to receiving a user selection of the option. A user selection of a given user from the plurality of users may be received. In response to receiving the user selection of the given user, an interface may be presented to the user for composing a communication directed to the given user.

In some implementations, the action includes a post to a social network operation. In such circumstances, in response to receiving a user selection of the option, an interface may be presented to the user for transmitting a communication to a social network associated with the user.

In some implementations, the viewing progress in the media asset of each of the plurality of users may be retrieved by accessing a social network associated with the user to retrieve identifiers of the plurality of users who are associated with the user. In some implementations, the first user may have accessed the media asset from a first provider and the second user may have accessed the media asset from a second provider. In some implementations, a first entry, associated with the first user, that indicates viewing progress in the media asset of the first user, may be retrieved from a first database associated with the first provider. A second entry, associated with the second user, which indicates viewing progress in the media asset of the second user may be retrieved from a second database associated with the second provider. In some implementations, the first provider may be an on-demand media server accessible to a set of users including the first user, and the second provider may be a user equipment device of the second user. In some implementations, the second database may include a directory of programs recorded on the user equipment device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
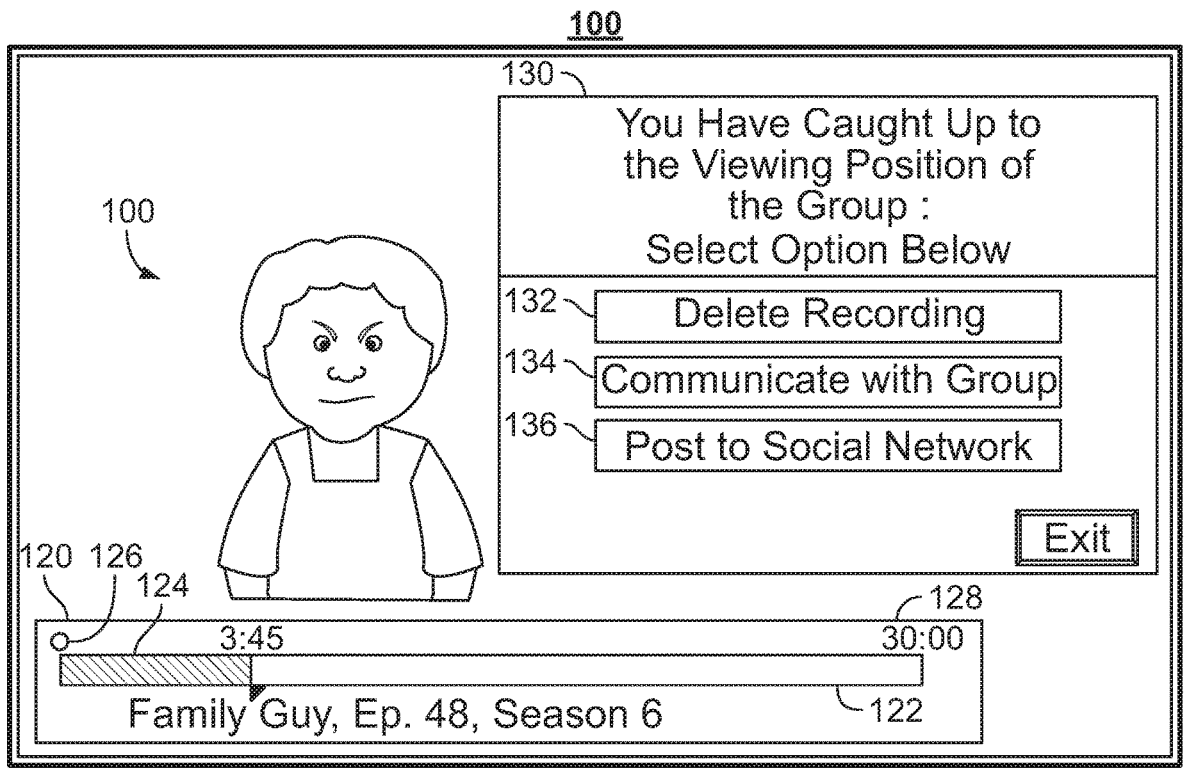
FIG. 1 shows an illustrative display screen that may be used to provide an interface for performing an action based on viewing progress of other users in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, a media application, a master media application, or a guidance application. In some embodiments, a plurality of applications is implemented on a given device.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media or machine-readable media. Computer- or machine-readable media include any media capable of storing data. The computer- or machine-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.)), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some embodiments, as users view media assets, the media guidance application keeps track of each user's viewing position (or viewing progress). In some implementations, the media guidance application may maintain or store a viewing history or viewing data structure for each of the users. The viewing history may include fields that identify a media asset and a last accessed viewing position. For example, if a given user paused or stopped viewing a given media asset before the end of the media asset, the media guidance application may indicate the last accessed viewing position (e.g., 23 minutes into the media asset). The media guidance application may also store an indication of whether the media asset was completely viewed or partially viewed by each user in the viewing history.

As referred to herein, the phrase "partially viewed" or "partially watched" refers to media content that a user has started viewing or accessing but stopped before reaching the end of the media content. In particular, a partially viewed media asset is one that a given user accessed past the starting point of the media asset but stopped before accessing the ending point of the media asset.

As referred to herein, the phrase "completely viewed" or "completely watched" refers to media content that a user has viewed or accessed from a starting point to an ending point of the media asset. A media asset may be completely viewed even though a user skipped through one or more segments in the middle of the media asset.

In some embodiments, the media guidance application may store associations between users in the viewing history for each user. For example, the viewing history may include an association field that lists one or more other users that are associated with the user corresponding to the viewing history. In some embodiments, the association field for a given user may be populated manually by the corresponding user or automatically by the media guidance application. For example, the media guidance application may query a database of a social network associated with the user for a list of users associated with the user on the social network. The media guidance application may populate the association field for the user with the list of users retrieved from the database of the social network.

In some embodiments, the media guidance application may receive a user request to access a media asset (e.g., the program "Family Guy"). In some embodiments, the media guidance application may track or monitor the user's viewing progress through the media asset and compare the viewing history to the maximum viewing position of other users associated with the user.

For example, in response to receiving the user request, the media guidance application may retrieve a viewing history for the user. The media guidance application may access the association field of the retrieved viewing history to obtain a list of users associated with the user. The media guidance application may retrieve a plurality of viewing histories of each of the users identified in the list of users. The viewing histories may be retrieved from one or more servers of one or more different service providers. For example, the media guidance application may determine that a first of the users accesses media content using a first service provider (e.g., an on-demand service provider such as AMAZON) and a second of the users accesses media content using a second service provider (a cable service provider or a different on-demand service provider such as NETFLIX). Based on this determination, the media guidance application may transmit a query to a database of the first service provider for a viewing history of the first user and may transmit a query to a database of the second service provider for a viewing history of the second user.

In some embodiments, after the media guidance application collects the viewing histories of one or more of the plurality of users associated with the user, the media guidance application may process the collected viewing histories to identify a maximum viewing progress among the plurality of users in the media asset (e.g., the program "Family Guy"). In some implementations, the maximum viewing progress refers to the latest viewing position each of a plurality of users have accessed in a given media asset.

For example, the media guidance application may select a first viewing history associated with a first of the plurality of users. The media guidance application may retrieve from the first viewing history a first viewing position in the media asset (e.g., the program "Family Guy"). The media guidance application may compare the retrieved first viewing position with a second viewing position in the media asset from a second viewing history of a second user of the plurality of users. If the first viewing position is earlier than the second viewing position, the media guidance application may store the first viewing position as the maximum viewing progress among the plurality of users in the media asset (e.g., the program "Family Guy"). If the second viewing position is earlier than the first viewing position, the media guidance application may store the second viewing position as the maximum viewing progress among the plurality of users in the media asset (e.g., the program "Family Guy"). The media guidance application may continue processing and comparing the remaining viewing positions from the viewing histories of each of the plurality of users to each other and/or to the currently stored maximum viewing progress. The media guidance application may continue updating the stored maximum viewing progress with the latest viewing position that each of the plurality of users have accessed in the media asset. In some embodiments, the media guidance application may provide various options to the user when the user's viewing progress matches the partial viewing progress of a plurality of users.

FIG. 1 shows an illustrative display screen 100 that may be used to provide an interface for performing an action based on the viewing progress of other users in accordance with an embodiment of the disclosure. Screen 100 includes a media asset (e.g., the program "Family Guy"), an information region 120 and an options region 130. In some embodiments, in response to the user requesting access to the media asset (e.g., the program "Family Guy"), the media guidance application may present screen 100 showing video of selected media asset 110. Information region 120 may include a title of media asset 110 and other information (e.g., description information) (not shown). Information region 120 may include a transport bar 122, which may indicate a starting point 126 of media asset 110, an ending point 128 of media asset 110 and viewing progress 124. Viewing progress 124 may indicate how much of the media asset the given user has watched relative to starting point 126 and ending point 128. Viewing progress 124 may be displayed as a particular color, shade, shape, etc.

The media guidance application may monitor viewing progress of the user while the user accesses the media asset. For example, the media guidance application may retrieve a current viewing position from memory corresponding to a current play position (e.g., 3:45 shown in the transport bar 122). The media guidance application may periodically or continuously compare the current viewing position with the maximum viewing progress of the plurality of users associated with the user. In some embodiments, in response to determining that the current viewing position matches or exceeds the maximum viewing progress of the plurality of users associated with the user, the media guidance application may present options region 130. Options region 130 may include an option 132 to delete the recording of media asset 110, an option 134 to communicate with one of the plurality of users, and/or an option 136 to post a comment to a social network associated with the user.

Accordingly, unlike traditional systems that provide an option to delete a media asset to a user when the user completes viewing a media asset, the media guidance application provides options to the user when the user reaches a maximum viewing progress (maximum partial viewing progress) of a group of users. In providing options to the user at the end of the media asset only when all other users finished viewing the media asset, traditional systems fail to account for the situation that, although some users have started watching a media asset but not finished (e.g., watched partially), they may no longer be interested in finishing the media asset (e.g., because the most interesting portions of the media asset have been watched). Thus, because they fail to account for this situation where one of the users will not return to finish viewing the media asset, the option to delete the media asset may never be provided to a given user even though the given user has finished viewing the media asset. As a result, a stale media asset that viewers are not interested in viewing to completion may not end up being selected for deletion, which causes storage space to be wasted and consumed unnecessarily.

The media guidance application according to embodiments described herein provides options (e.g., an option to delete) based on the latest viewing position each user in a group has accessed and does not require all the users to complete watching the media asset before the options are provided. As such, more efficient storage and communication capabilities may be achieved. For example, a user can make a decision on whether to delete a media asset when the user reaches the latest viewing position of a group even though the media asset has not been viewed to completion. The user may decide to delete the media asset at that point because the rest of the media asset may not be interesting, which may have been the reason none of the other users watched the rest of the media asset.

In some embodiments, the media guidance application may provide delete recording option 132. In response to receiving a user selection of option 132, the media guidance application may delete media asset 110 from storage. In some implementations, the media guidance application may immediately remove the media asset from storage. In some implementations, the media guidance application may mark media asset 110 for deletion such that when storage space is needed, media asset 110 is prioritized for deletion above other media assets.

In some embodiments, the media guidance application may provide a communicate with group option 134. In response to receiving a user selection of option 134, the media guidance application may navigate the user to display 200 (FIG. 2) where a list of users 220 is presented to the user.

In some embodiments, the media guidance application may provide a post to social network option 136. In response to receiving a user selection of option 136, the media guidance application may present the user with an interface for composing a message. After the user finishes composing the message, the media guidance application may identify a social network associated with the user. The media guidance application may post the composed message to the social network for other users who are associated with the user on the social network to see. In some embodiments, the media guidance application may automatically populate the interface for composing the message with information about media asset 110 from information region 120 (e.g., the title of media asset 110). The user may add additional commentary about media asset 110, and the media guidance application may transmit the composed message including the identifier of the media asset 110 to the social network associated with the user to be posted.

Figure 2:
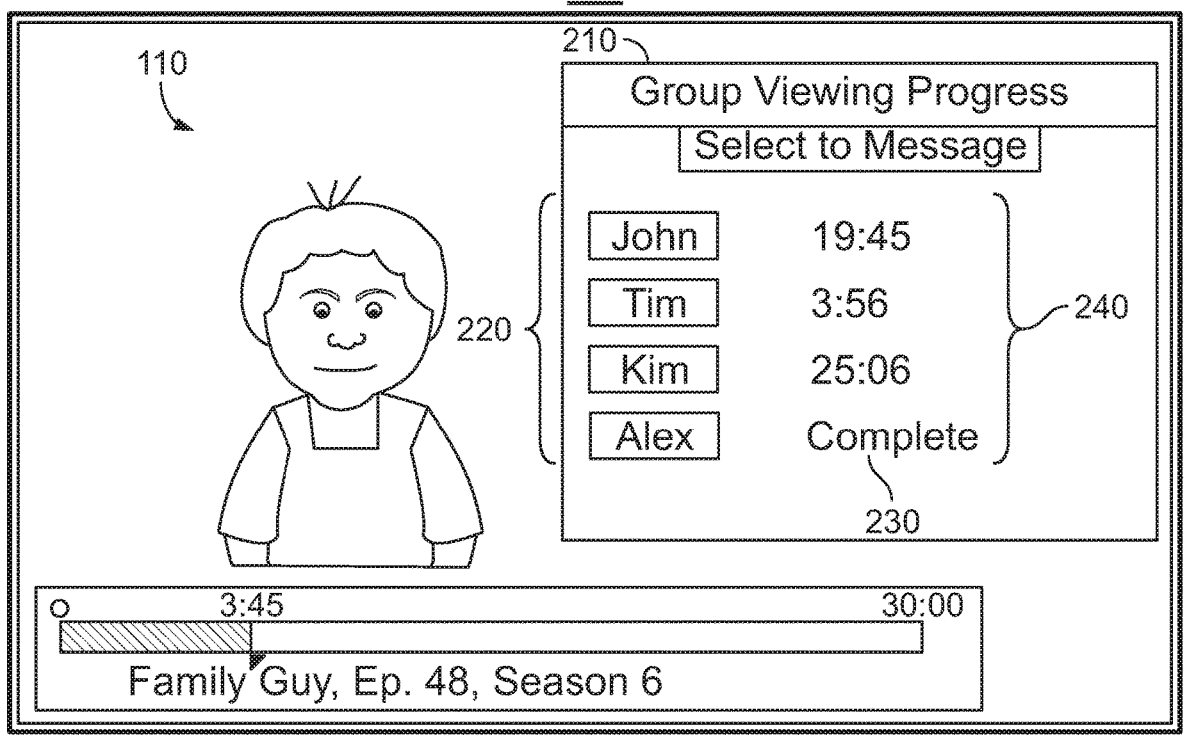
FIG. 2 shows an illustrative display screen that may be used to perform an action based on viewing progress of other users with an embodiment of the disclosure.

FIG. 2 shows an illustrative display screen that may be used to perform an action based on viewing progress of other users with an embodiment of the disclosure. The list of users 220 in display 200 may correspond to the plurality of users that have accessed media asset 110. The list of users may be presented in region 210. The media guidance application may retrieve the viewing position stored in the viewing history for each user listed in region 210. The media guidance application may present for each user listed in region 210 the current viewing position 240 in media asset 110 for that user. In some embodiments, the media guidance application may indicate whether the media asset was completely viewed with indicator 230 and/or partially viewed for each user listed in region 210.

In some embodiments, the user may select one or more users listed in region 210 (e.g., by highlighting the given user and/or tapping on the name of the given user). In response to receiving the user selection of the one or more users, the media guidance application may present a chat window or message composition window. The user may communicate with the selected one or more users using the chat window or message composition window.

For example, upon the user reaching a maximum viewing position of a group of users, the user may be provided the opportunity to communicate with these users. The user may freely discuss the media asset up to the point the current user has watched with each of the listed viewers without worrying about revealing spoilers. This is because all of the users in region 210 have already seen the media asset at least up to the point where the current user is.

In some embodiments, the media guidance application may present region 210 as soon as the current viewing position reaches the maximum viewing progress instead of presenting region 130 (FIG. 1). Namely, the user may not need to select option 134 (FIG. 1) to be presented with region 210.

In some embodiments, the media guidance application may remove users listed in region 210 if the current viewing position of the user passes the play position of one or more users listed in region 210. For example, if the user continues accessing media asset 110 to reach viewing position 5:45 (min:sec), the media guidance application may remove user "Tim" from list of users 220 (e.g., because user "Tim" has an earlier play position than the current user's play position). Specifically, as the current user continues accessing media asset 110, the media guidance application may determine that the current play position has exceeded the play position associated with one of the users in the group (e.g., play position 3:56 of the user "Tim"). In response, the media guidance application may present region 210 to the current user, excluding one of the users "Tim" from list of users 220. This prevents the current user from selecting to communicate with a user who has not caught up to where the current user is and thereby accidentally revealing a spoiler.

In some embodiments, the media guidance application may generate a new maximum viewing progress for the group of users when the current play position exceeds the previously computed maximum viewing progress. The new maximum viewing progress may be computed by removing the earliest play position from all the play positions in the group of users and selecting for the next earliest play position among the group of users. For example, the previous maximum viewing progress may have been 3:56 because this is the earliest play position among the play positions of each of the plurality of users (19:45, 3:56, 25:06, compete). When the current user continues accessing media asset 110 from play position 3:45 to play position 5:45, which exceeds the maximum viewing progress 3:56, the media guidance application may compute a new maximum viewing progress. In particular, when the current play position 3:45 reaches 5:45, thereby exceeding the maximum viewing progress 3:56, the media guidance application may remove from the list of play positions associated with the plurality of users all of the play positions that precede the current user's play position 5:45. For example, the media guidance application may remove play position 3:56 corresponding to user "Tim" because that play position precedes the current user's play position 5:45. The media guidance application may search the remaining play positions (e.g., 19:45, 25:06, compete) to select the next earliest play position (e.g., 19:45) and may store as the new maximum viewing progress the selected next earliest play position 19:45. As the current user continues accessing media asset 110, the media guidance application may determine when the current play position exceeds the new maximum viewing progress. In response to determining that the current play position meets or exceeds the new maximum viewing progress, the media guidance application may present region 210 to the current user, excluding any user who is associated with a play position that is earlier than the new maximum viewing progress and/or the current user's play position.

Figure 3:
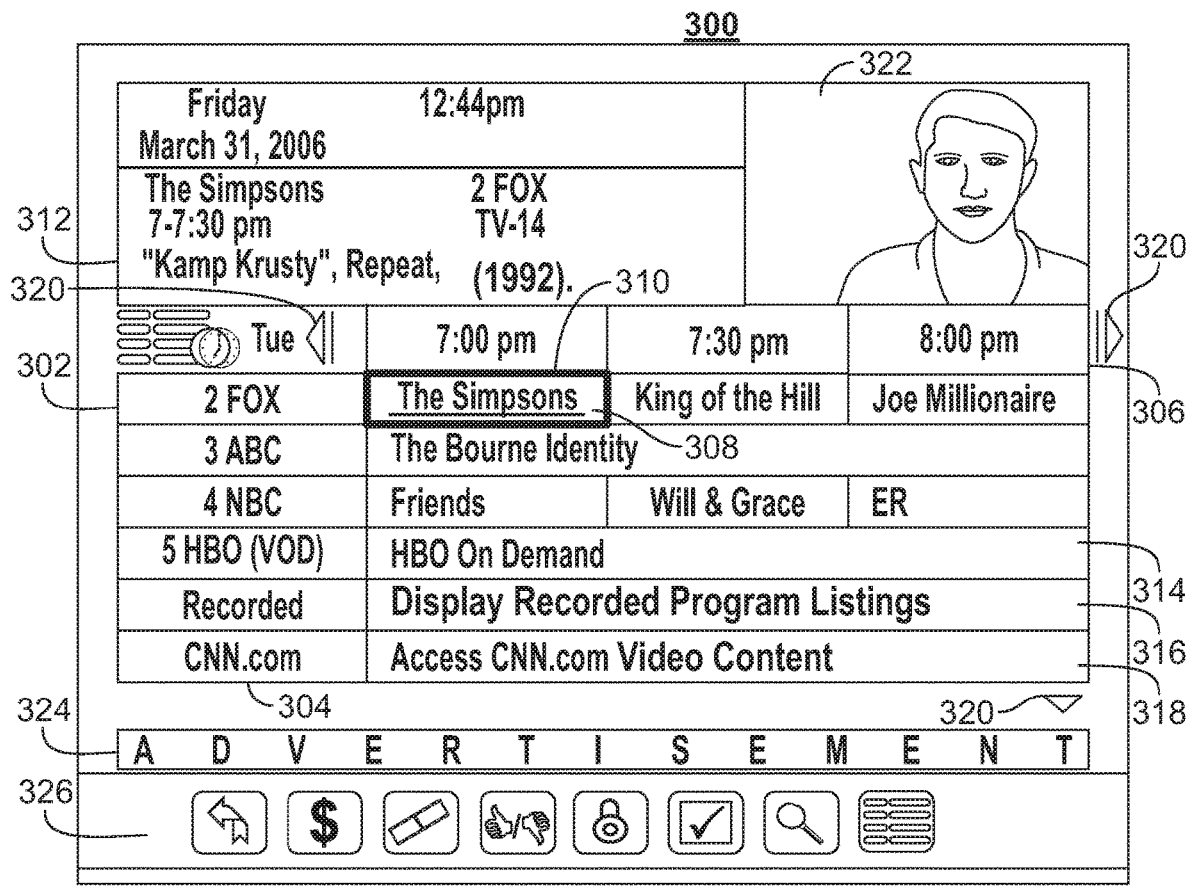
FIGS. 3 and 4 show illustrative display screens that may be used to provide media guidance application listings in accordance with an embodiment of the disclosure.
Figure 4:
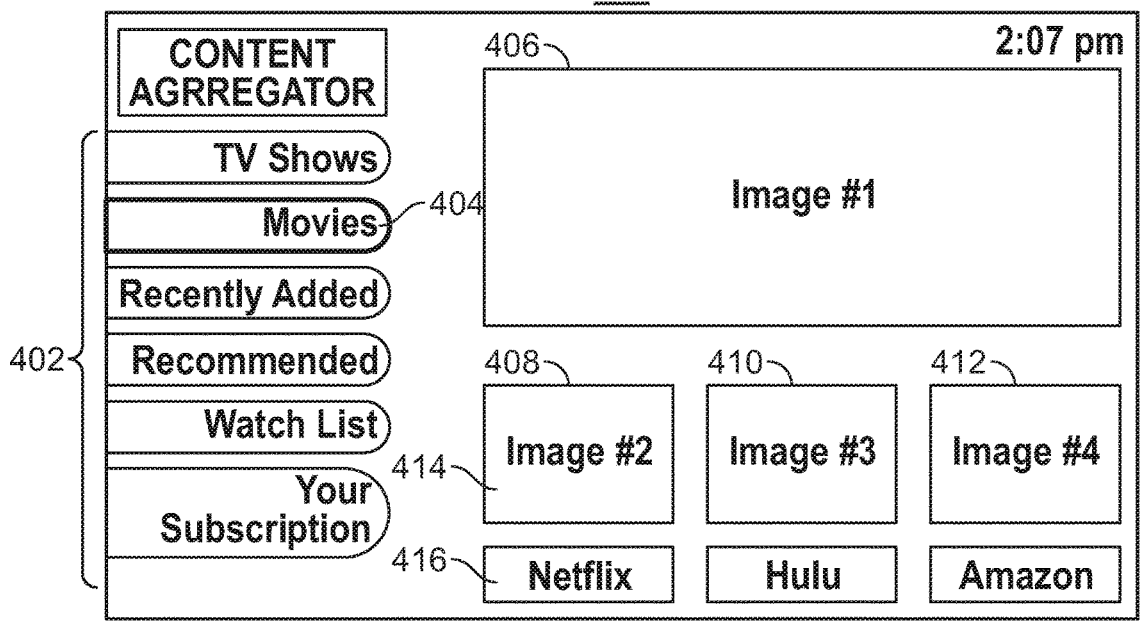

The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. In some implementations, the grid of program listings in display 300 may represent only favorite channels of the user. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO providing "The Sopranos" and "Curb Your Enthusiasm" via the HBO GO service). THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on various organization criteria, such as recommendations, inclusion in a watch list, and type of content. In display 400, movie listing option 404 is selected, thus providing listings 406, 408, 410, and 412 as movies. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the specified content provider).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 5:
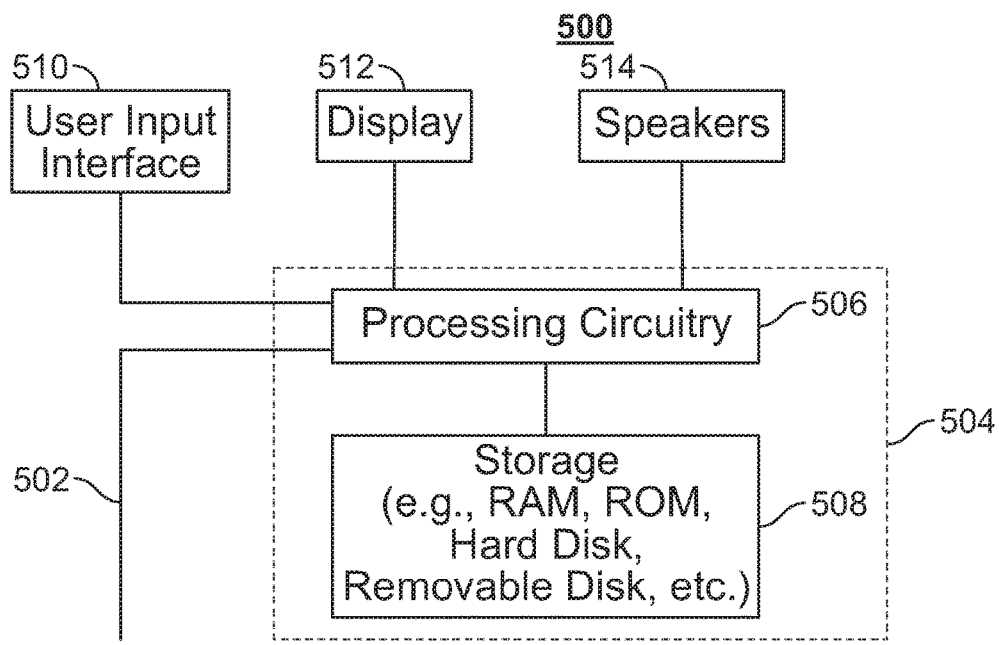
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. Equipment device 500 may be implemented on user television equipment 602, user computer equipment 604, and wireless user communications device 606. Additionally, device 500 may be implemented as part of the servers associated with content providers 616 and 618, and as part of the server associated with content aggregator 630. Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508. For example, storage 508 may be used to store viewing histories and/or maximum viewing progress for various users.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

When equipment device 500 is implemented on user television equipment 602, user computer equipment 604, or wireless user communications device 606, a user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets HTML web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
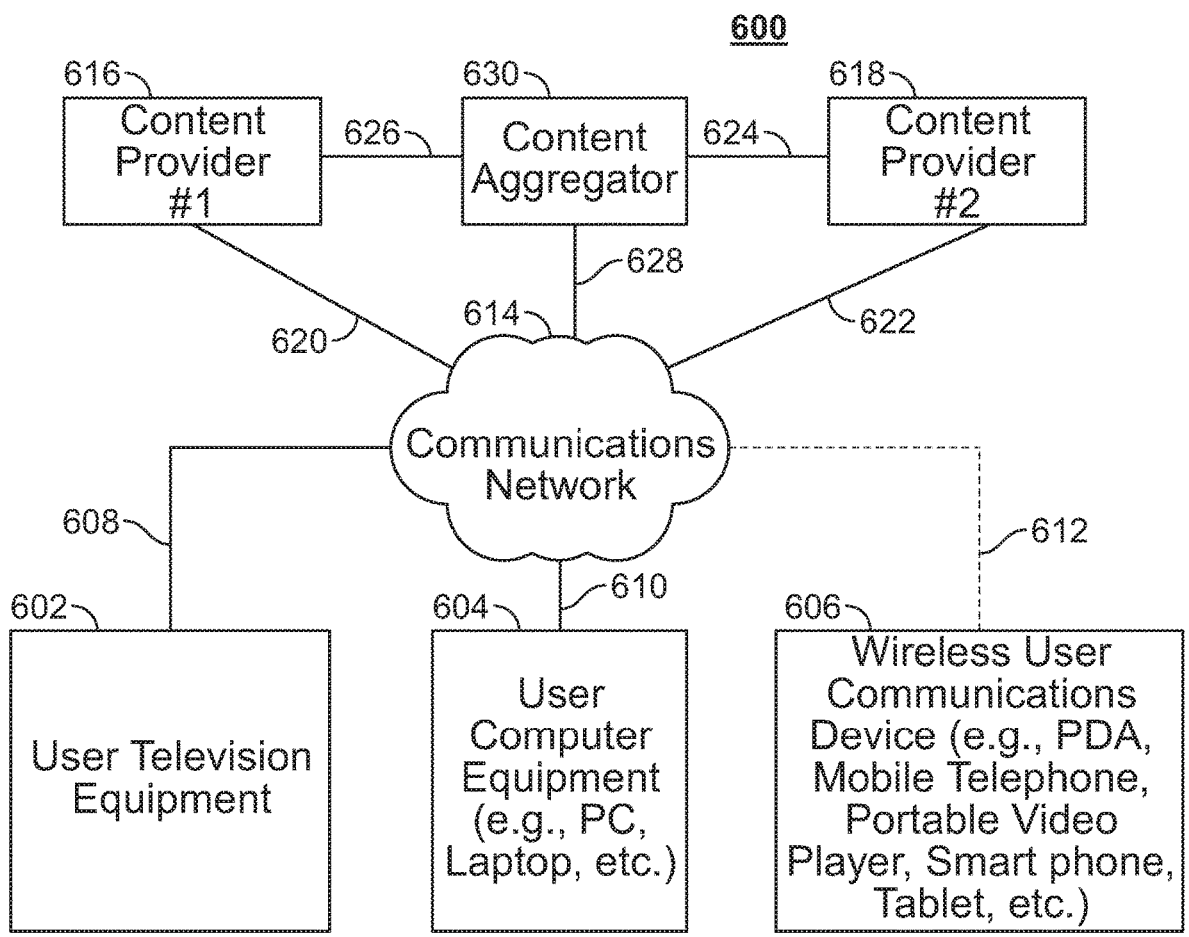
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. Additionally, equipment device 500 may be implemented as part of the servers associated with content providers 616 and 618, and as part of the server associated with content aggregator 630.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, and wireless user communications device 606) may be referred to as a "second screen device." In some implementations, user television equipment 602, user computer equipment 604, and wireless user communications device 606 may include one or more smartphones and/or tablet devices. For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, viewing progress information, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes providers 616 and 618, as well as content aggregator 630 coupled to communications network 614 via communication paths 620, 622, 624, 626 and 628, respectively. Paths 620, 622, 624, 626 and 628 may include any of the communication paths described above in connection with paths 608, 610, and 612. Communications with the content provider 616 and content aggregator 630 may be exchanged over one or more communications paths, but are shown as a single path in FIG. 6 to avoid overcomplicating the drawing. In addition, there may be more than one of each of content provider 616 and content aggregator 630, but only two content providers and one of each content aggregator is shown in FIG. 6 to avoid overcomplicating the drawing. (The different types of each of these sources are discussed below.) Although communications between content providers 616 and 618 with user equipment devices 602, 604, and 606 are shown as through communications network 614, in some embodiments, content providers 616 and 618 may communicate directly with user equipment devices 602, 604, and 606 via communication paths (not shown) such as those described above in connection with paths 608, 610, and 612. In some cases, communications between content providers 616 and 618 with user equipment devices 602, 604, and 606 occur through content aggregator 630. For example, communications between user television equipment 602 and content provider 416 may occur over paths 626, 628, and 608.

Content providers 616 and 618 may include one or more types of content distribution equipment including a television distribution facility, service providers, cable system headend, satellite distribution facility, programming sources (e.g., television broadcasters, such as NBC, ABC, HBO, etc.), intermediate distribution facilities and/or servers, Internet providers, on-demand media servers (e.g., Netflix, Hulu, Amazon, etc.), and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content provider 616 may include cable sources, satellite providers, on-demand providers, Internet providers, over-the-top content providers, or other providers of content. Content provider 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. In some embodiments, control circuitry 504 implemented on content aggregator 630 may transmit a request over paths 626 and 624 for media guidance data from content providers 616 and 618.

Content aggregator 630 may collect media guidance data (e.g., viewing histories) from content providers 616 and 618, and provide such data, as described above. In some embodiments, content aggregator 630 may be the media application, discussed above and below that collects viewing histories for multiple users. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Content aggregator 630 may communicate with equipment devices 602, 604, and 606 by way of clients installed on each of the equipment devices. For example, when a user initially subscribes to the content aggregator subscription, control circuitry 504, implemented on content aggregator 630, may facilitate the transfer of a client application to the equipment device. Control circuitry 504, implemented on each of equipment devices 602, 604, and 606, may then download, install, and configure the client application from content aggregator 630. The client application may then facilitate the delivery of media and media guidance data from content aggregator 630 to the equipment devices. The client application may further include a user interface, which control circuitry 504, implemented on equipment device 500, generates for display on display 512, for allowing the user to interact with media listings using user input interface 510, code for handling Digital Rights Management (DRM) data, as well as codecs and players needed for generating media for display on display 512. In some embodiments, the client may be configured to communicate directly with content providers 616 and 618. Content aggregator 630 may include a corresponding communications interface, so that control circuitry 504, implemented on the content aggregator may receive input from the client implemented on each equipment device. Control circuitry 504, implemented on content aggregator 630, may then send and receive data from each client, as well as from each content provider 616 and 618, using the communications interface. Content aggregator 630 may additionally include one or more databases to store subscriber information, viewing history data structures, and media content listings from content providers 416 and 418.

In some embodiments, content aggregator 630 may communicate with equipment devices by way of an Internet browser available on equipment devices 602, 604, and 606. For example, user computer equipment 604 may include an implementation of Internet Explorer. When the user wishes to access media offerings of the content aggregator subscription (e.g., a user may wish to access Netflix listings available as part of the content aggregator subscription to which the user subscribes to), control circuitry 504, implemented on equipment device 604, may output a browser window containing video mosaic display 400 on display 512. Control circuitry 504, implemented on equipment device 604, may then receive a selection from user input interface 510, indicating that the user wishes to access content from a subscription service that is part of the content aggregator subscription. For example, the user may direct a mouse pointer to highlight and select text portion 416 (e.g., Netflix). Control circuitry 504 implemented on equipment device 604 may then transmit the input corresponding to text portion 416 to the process running the Internet browser, enabling the browser to retrieve and display the Internet web site (e.g., www.netflix.com) associated with the selected subscription service.

In some embodiments, guidance data from content aggregator 630 may be provided to users' equipment using a client-server approach. For example, a user equipment device may pull media guidance data from a server, or a server may push media guidance data to a user equipment device. In some embodiments, a guidance application client residing on the user's equipment may initiate sessions with content aggregator 630 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Content aggregator 630 may provide user equipment devices 602, 604, and 606, the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), viewing progress in one or more media assets, mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., content aggregator 630) running on control circuitry of the remote server. When executed by control circuitry of the remote server (such as content aggregator 630), the media guidance application may instruct the control circuitry to generate the guidance application displays and transmit the generated displays to the user equipment devices. The server application may instruct the control circuitry of the content aggregator 630 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, AMAZON, and HULU, which provide audio and video via IP packets. Youtube is a trademark owned by Google Inc., Netflix is a trademark owned by Netflix Inc., Amazon is a trademark owned by Amazon Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content provider 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content providers 616 and one or more content aggregators 630. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

Figure 7:
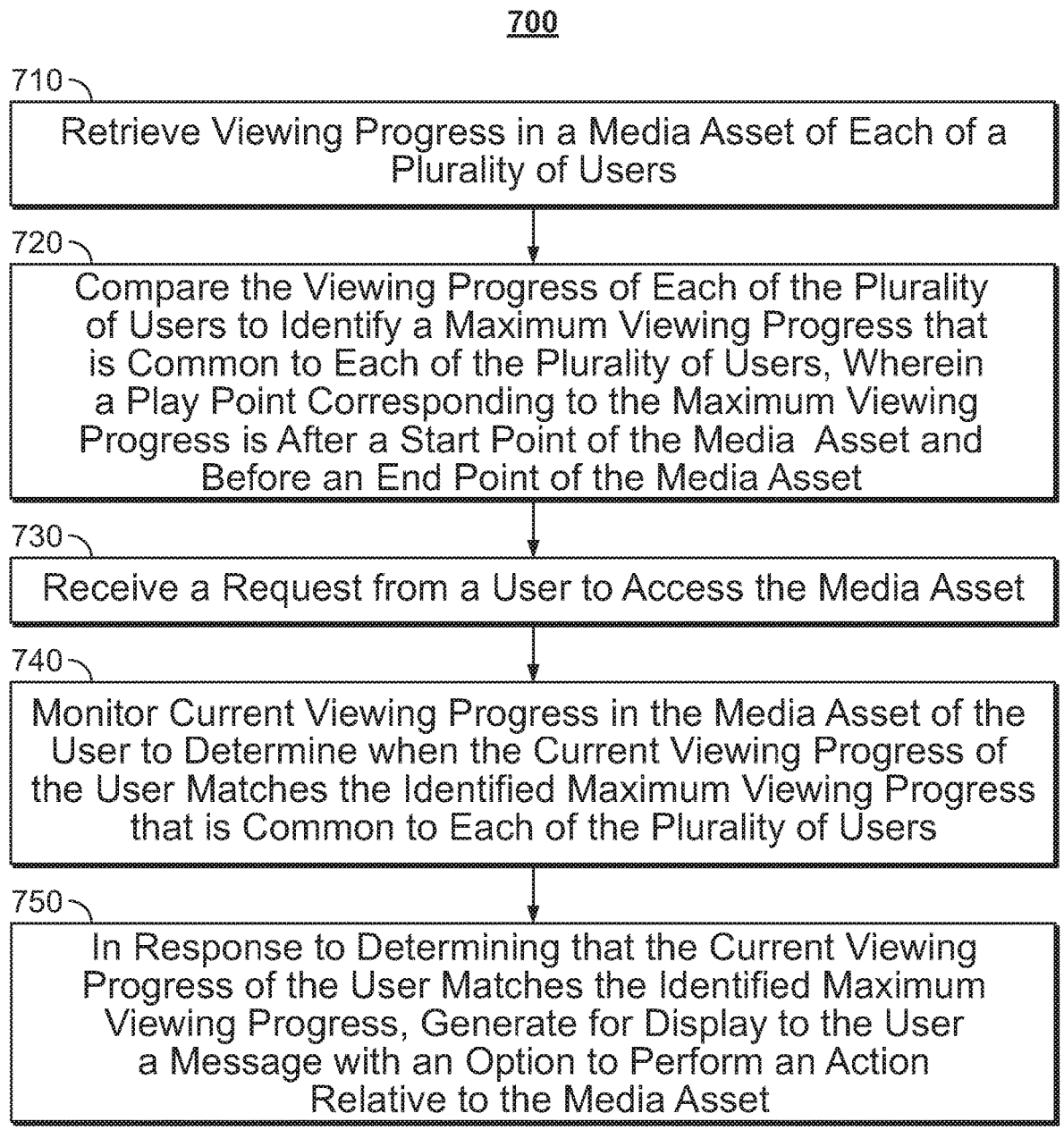
FIGS. 7 and 8 are illustrative flow diagrams for performing an action based on viewing progress of other users in accordance with some embodiments of the disclosure.

FIG. 7 is an illustrative flow diagram 700 for performing an action based on viewing progress of other users in accordance with some embodiments of the disclosure. At step 710, viewing progress in a media asset of each of a plurality of users is retrieved. For example, the media guidance application may query one or more databases on one or more servers for viewing histories of each of a plurality of users associated with a given user. In particular, the media guidance application may identify a set of users that is associated with a given user (e.g., the user requesting access to a media asset). The media guidance application may then retrieve a viewing history for each identifier user (e.g., from content aggregator 630) and determine whether each user has also accessed the media asset and the viewing position for each user in the media asset.

At step 720, the viewing progress of each of the plurality of users is compared to identify a maximum viewing progress that is common to each of the plurality of users, wherein a play point corresponding to the maximum viewing progress is after a start point of the media asset and before an end point of the media asset. For example, the media guidance application may retrieve a viewing position for one user and compare the retrieved viewing position to the viewing position in the media asset for another user. The media guidance application may store the earlier of the compared viewing positions as the maximum viewing progress. The media guidance application may then compare the remaining viewing positions of the other users to the maximum viewing progress. The media guidance application may update the maximum viewing progress to reflect the earliest viewing position among all the viewing positions for the plurality of users.

At step 730, a request from a user to access the media asset is received. For example, a user may select a program listing from a grid displayed by the media guidance application. Specifically, the user may request to access media asset 110 by selecting a program listing (FIGS. 1 and 3).

At step 740, current viewing progress in the media asset of the user is monitored to determine when the current viewing progress of the user matches the identified maximum viewing progress that is common to each of the plurality of users. For example, the media guidance application may continuously or periodically retrieve the current viewing position from transport bar 122 (FIG. 1). The media guidance application may compare the current viewing position to the stored maximum viewing progress. The media guidance application may determine that the current viewing position matches the stored maximum viewing progress when the current viewing position reaches or exceeds the stored maximum viewing progress.

At step 750, in response to determining that the current viewing progress of the user matches the identified maximum viewing progress, a message with an option to perform an action relative to the media asset is generated for display to the user. For example, the media guidance application may present options region 130 in response to determining that the current viewing progress of the user matches the identified maximum viewing progress (FIG. 1). Alternatively or in addition, the media guidance application may present region 210 in response to determining that the current viewing progress of the user matches the identified maximum viewing progress (FIG. 2).

Figure 8:
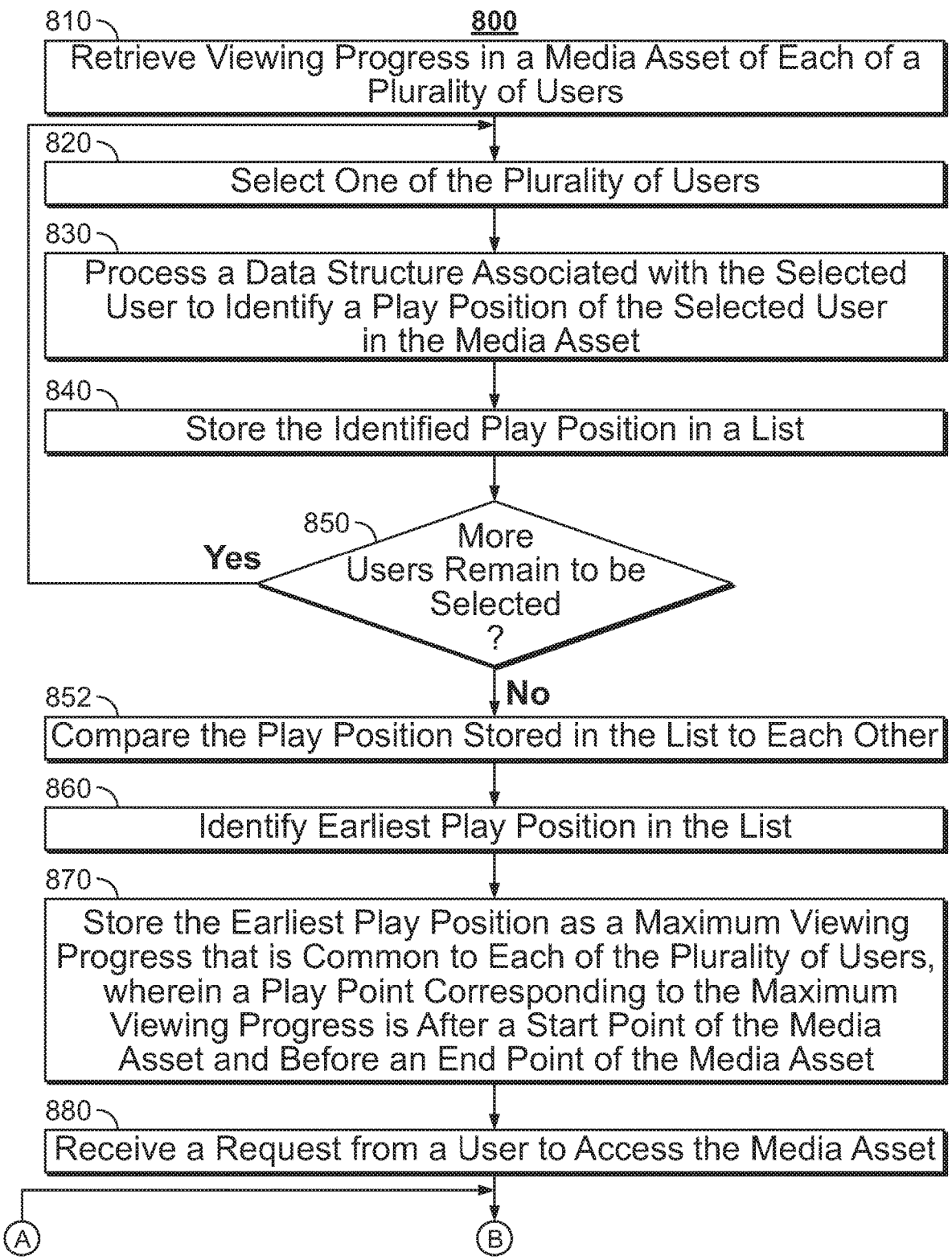
Figure 8:
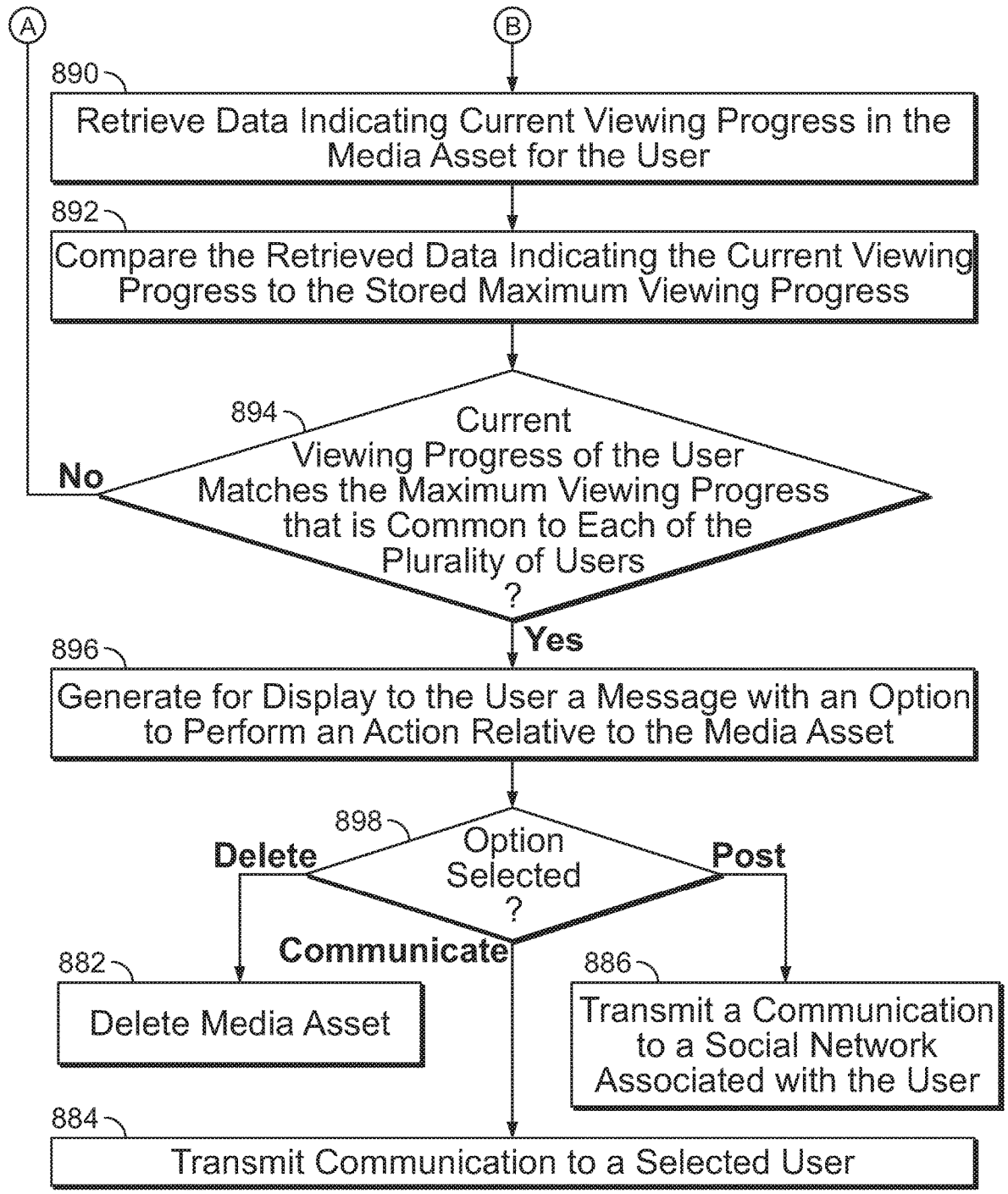

FIG. 8 is an illustrative flow diagram 800 for performing an action based on the viewing progress of other users in accordance with some embodiments of the disclosure. At step 810, viewing progress in a media asset of each of a plurality of users is retrieved. For example, the media guidance application may query one or more databases on one or more servers for viewing histories of each of a plurality of users associated with a given user. In particular, the media guidance application may identify a set of users that are associated with a given user (e.g., the user requesting access to a media asset). The media guidance application may then retrieve a viewing history for each identifier user (e.g., from content aggregator 630) and determine whether each user has also accessed the media asset and the viewing position for each user in the media asset.

At step 820, one of the plurality of users is selected. For example, the media guidance application may select a first of the plurality of users that is associated with the given user.

At step 830, a data structure associated with the selected user is processed to identify a play position of the selected user in the media asset. For example, the media guidance application may retrieve a viewing history associated with the selected user. The media guidance application may retrieve from the viewing history the viewing position value stored in the viewing position field of the associated media asset. Specifically, the media guidance application may retrieve an identifier of the media asset (e.g., the media asset selected by a given user for current viewing). The media guidance application may search the viewing history media asset values stored in a media asset field for a media asset value that matches the media asset identifier. The media guidance application may retrieve the viewing position (play position) associated with the media asset value that matches the media asset identifier.

At step 840, the identified play position is stored in a list.

At step 850, a determination is made as to whether more users remain to be selected. In response to determining that more users remain to be selected, the process proceeds to step 820; otherwise, the process proceeds to step 852. For example, the media guidance application may determine whether the currently selected user is the last user in the list of users.

At step 852, the play positions stored in the list are compared to each other. For example, the media guidance application may search all the play positions stored in the list for the earliest play position (the play position with the lowest value).

At step 860, the earliest play position in the list is identified.

At step 870, the earliest play position is stored as a maximum viewing progress that is common to each of the plurality of users, wherein a play point corresponding to the maximum viewing progress is after a start point of the media asset and before an end point of the media asset.

At step 880, a request from a user to access the media asset is received. For example, a user may select a program listing from a grid displayed by the media guidance application. Specifically, the user may request to access media asset 110 by selecting a program listing (FIGS. 1 and 3).

At step 890, data indicating current viewing progress in the media asset for the user is retrieved. For example, the media guidance application may continuously or periodically retrieve the current viewing position from transport bar 122 (FIG. 1). The media guidance application may compare the current viewing position to the stored maximum viewing progress.

At step 892, the retrieved data indicating the current viewing progress is compared to the stored maximum viewing progress. For example, the media guidance application may compare the current viewing position to the stored maximum viewing progress.

At step 894, a determination is made as to whether the current viewing progress of the user matches the maximum viewing progress that is common to each of the plurality of users. In response to determining that the current viewing progress matches, the process proceeds to step 896; otherwise, the process proceeds to step 890. For example, the media guidance application may determine that the current viewing position matches the stored maximum viewing progress when the current viewing position reaches or exceeds the stored maximum viewing progress.

At step 896, a message with an option to perform an action relative to the media asset is generated for display to the user. For example, the media guidance application may present options region 130 in response to determining that the current viewing progress of the user matches the identified maximum viewing progress (FIG. 1). Alternatively or in addition, the media guidance application may present region 210 in response to determining that the current viewing progress of the user matches the identified maximum viewing progress (FIG. 2).

At step 898, a determination is made as to which option a user selected. In response to determining the user selected a delete option, the process proceeds to step 882. In response to determining that the user selected a communicate option, the process proceeds to step 884. In response to determining that the user selected a post option, the process proceeds to step 886.

At step 882, the media asset is deleted.

At step 884, a communication is transmitted to a selected user.

At step 886, a communication is transmitted to a social network associated with the user.

As referred to herein, the term "in response to" refers to initiated as a result of. For example, a first action being performed in response to a second action may include interstitial steps between the second action and the first action. As referred to herein, the term "directly in response to" refers to caused by. For example, a first action being performed directly in response to a second action may not include interstitial steps between the second action and the first action.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flow- charts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for performing actions based on respective progress times of a group of users of a media asset, the method comprising:
    receiving a request from a first user of the group of users for accessing a media asset to view a copy of the media asset stored on a device associated with the first user;
    retrieving, for each respective user of the group of users, a current progress time in the media asset, wherein the current progress time for a respective user indicates what time portion of the media asset was accessed by the respective user;
    identifying, for the first user, a plurality of other users of the group of users that have a current progress time that matches or is later than the current progress time of the first user, wherein the plurality of other users does not include the first user;
    generating for display to the first user a list of the plurality of other users;
    monitoring the group of users to identify an updated progress time for each respective user of the group of users;
    determining an earliest progress time for the plurality of other users based on the updated progress times;
    determining that the updated progress time of the first user matches or is later than the earliest progress time for the plurality of other users; and
    in response to determining that the first user will not return to viewing the copy of the media asset based on the determining that the updated progress time of the first user matches or is later than the earliest progress time for the plurality of other users:
        generating for display to the first user an option to delete the copy of the media asset stored on the device associated with the first user; and
        deleting the copy of the media asset stored on the device associated with the first user in response to receiving a user selection of the option.

2. The method of claim 1, further comprising updating the plurality of other users based on the updated progress times, wherein updating the plurality of other users based on the updated progress times comprises:
    in response to determining that a second user of the plurality of other users has an updated progress time earlier than the earliest progress time, removing the second user from the plurality of other users; and
    in response to determining that a third user in the group of users but not in the plurality of other users has an updated progress time that matches or is later than the earliest progress time, adding the third user to the plurality of other users.

3. The method of claim 1, further comprising:
    storing, for each user of the group of users, a copy of the media asset at a scheduled transmission time of the media asset; and
    monitoring the current progress time of each respective user of the group of users in the stored copy of the media asset to retrieve the current progress time of each respective user of the group of the users.

4. The method of claim 1, wherein the option is a first option, the method further comprising:
generating for display a second option to perform a communicate operation;
generating for display a list that identifies each of the plurality of other users in response to receiving a user selection of the second option;
receiving a user selection of a given user from the plurality of other users; and
in response to receiving the user selection of the given user, presenting an interface to the first user for composing a communication directed to the given user.

5. The method of claim 1, wherein the option is a first option, the method further comprising:
generating for display a second option to perform a post to a social network operation; and
in response to receiving a user selection of the second option, presenting an interface to the first user for transmitting a communication to a social network associated with the first user.

6. The method of claim 1, wherein retrieving, for each respective user of the group of users, a current progress time in the media asset comprises accessing a social network associated with the first user to retrieve identifiers of the group of users who are associated with the first user.

7. The method of claim 1, wherein the first user of the group of users has accessed the media asset from a first provider and a second user of the group of users has accessed the media asset from a second provider.

8. The method of claim 7, further comprising:
retrieving from a first database associated with the first provider a first entry, associated with the first user, that indicates progress time in the media asset of the first user; and
retrieving from a second database associated with the second provider a second entry, associated with the second user, that indicates progress time in the media asset of the second user.

9. The method of claim 7, wherein the first provider comprises an on-demand media server accessible to a set of users including the first user, and wherein the second provider comprises a user equipment device of the second user.

10. A system for performing actions based on respective progress times of a group of users of a media asset, the system comprising:
communication circuitry;
input/output (I/O) circuitry; and
control circuitry configured to:
receive a request from a first user of the group of users for accessing a media asset to view a copy of the media asset stored on a device associated with the first user;
retrieve, for each respective user of the group of users, a current progress time in the media asset, wherein the current progress time for a respective user indicates what time portion of the media asset was accessed by the respective user;
identify, for the first user, a plurality of other users of the group of users that have a current progress time that matches or is later than the current progress time of the first user, wherein the plurality of other users does not include the first user;
generate for display to the first user a list of the plurality of other users;
monitor the group of users to identify an updated progress time for each user of the group of users;
determine an earliest progress time for the plurality of other users based on the updated progress times;
determining that the updated progress time of the first user matches or is later than the earliest progress time for the plurality of other users; and
in response to determining that the first user will not return to viewing the copy of the media asset based on the determining that the updated progress time of the first user matches or is later than the earliest progress time for the plurality of other users:
generate for display to the first user an option to delete the copy of the media asset stored on the device associated with the first user; and
delete the copy of the media asset stored on the device associated with the first user in response to receiving a user selection of the option.

11. The system of claim 10, wherein the control circuitry is further configured to update the plurality of other users based on the updated progress times, and wherein the control circuitry, when updating the plurality of other users based on the updated progress times, is configured to:
in response to determining that a second user of the plurality of other users has an updated progress time earlier than the earliest progress time, remove the second user from the plurality of other users; and
in response to determining that a third user in the group of users but not in the plurality of other users has an updated progress time that matches or is later than the earliest progress time, add the third user to the plurality of other users.

12. The system of claim 10, wherein the control circuitry is further configured to:
store, for each user of the group of users, a copy of the media asset at a scheduled transmission time of the media asset; and
monitor the current progress time of each respective user of the group of users in the stored copy of the media asset to retrieve the current progress time of each respective user of the group of the users.

13. The system of claim 10, wherein the option is a first option, and wherein the control circuitry is further configured to:
generate for display a second option to perform a communicate operation;
generate for display a list that identifies each of the plurality of other users in response to receiving a user selection of the second option;
receive a user selection of a given user from the plurality of other users; and
in response to receiving the user selection of the given user, present an interface to the first user for composing a communication directed to the given user.

14. The system of claim 10, wherein the option is a first option, and wherein the control circuitry is further configured to:
generate for display a second option to perform a post to a social network operation; and
in response to receiving a user selection of the second option, present an interface to the first user for transmitting a communication to a social network associated with the first user.

15. The system of claim 10, wherein the control circuitry configured to retrieve, for each respective user of the group of users, a current progress time in the media asset is further configured to access a social network associated with the first user to retrieve identifiers of the group of users who are associated with the first user.

16. The system of claim 10, wherein the first user of the group of users has accessed the media asset from a first provider and a second user of the group of users has accessed the media asset from a second provider.

17. The system of claim 16, wherein the control circuitry is further configured to:
- retrieve from a first database associated with the first provider a first entry, associated with the first user, that indicates progress time in the media asset of the first user; and
- retrieve from a second database associated with the second provider a second entry, associated with the second user, that indicates progress time in the media asset of the second user.

18. The system of claim 16, wherein the first provider comprises an on-demand media server accessible to a set of users including the first user, and wherein the second provider comprises a user equipment device of the second user.

* * * * *